United States Patent
Byun et al.

(10) Patent No.: US 9,225,002 B2
(45) Date of Patent: Dec. 29, 2015

(54) RECHARGEABLE BATTERY HAVING FUSE UNIT

(71) Applicant: SAMSUNG SDI CO., LTD., Yongin-si, Gyeonggi-do (KR)

(72) Inventors: Sang-Won Byun, Yongin-si (KR); Min-Hyung Guen, Yongin-si (KR); Yong-Chul Seo, Yongin-si (KR); Yun-Jung Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 63 days.

(21) Appl. No.: 14/255,944

(22) Filed: Apr. 17, 2014

(65) Prior Publication Data

US 2015/0118528 A1 Apr. 30, 2015

Related U.S. Application Data

(60) Provisional application No. 61/895,304, filed on Oct. 24, 2013.

(51) Int. Cl.
*H01M 2/04* (2006.01)
*H01M 2/20* (2006.01)
*H01M 2/34* (2006.01)

(52) U.S. Cl.
CPC ............. *H01M 2/34* (2013.01); *H01M 2/043* (2013.01); *H01M 2/0486* (2013.01); *H01M 2/345* (2013.01); *H01M 2/348* (2013.01); H01M 2200/103 (2013.01); H01M 2200/20 (2013.01)

(58) Field of Classification Search
None
See application file for complete search history.

(56) References Cited

U.S. PATENT DOCUMENTS

| 2011/0183165 A1* | 7/2011 | Byun et al. ............... 429/61 |
| 2011/0183193 A1* | 7/2011 | Byun et al. ............... 429/178 |
| 2013/0084471 A1* | 4/2013 | Han et al. ................. 429/7 |

FOREIGN PATENT DOCUMENTS

| EP | 2 515 363 A1 | 10/2012 |
| EP | 2393145 B1 * | 5/2013 |
| JP | 05-325943 | 12/1993 |
| KR | 10-2012-0118315 A | 6/2012 |

OTHER PUBLICATIONS

EPO Search Report dated Feb. 24, 2015, for corresponding European Patent application 14168211.2, (8 pages).
Machine English Translation of JP 05-325943 dated Dec. 10, 1993.

* cited by examiner

*Primary Examiner* — Gregg Cantelmo
(74) *Attorney, Agent, or Firm* — Christie, Parker & Hale, LLP

(57) ABSTRACT

A rechargeable battery includes: an electrode assembly including first and second electrodes; a case containing the electrode assembly; a cap plate covering an opening of the case; a first terminal protruding outside of the case and electrically coupled to the first electrode; a second terminal protruding outside of the case and electrically coupled to the second electrode; a current collector including first and second fuse units, and electrically coupled to the first electrode, wherein the first fuse unit and the second fuse unit each have a cross-sectional area smaller than a cross-sectional area of an adjacent region and are spaced from each other; and a connector coupled to the current collector between the first fuse unit and the second fuse unit, and adapted to electrically couple the cap plate and the current collector, wherein a resistance of the connector is less than that of the first terminal.

16 Claims, 10 Drawing Sheets

RECHARGEABLE BATTERY HAVING FUSE UNIT

CROSS-REFERENCE TO RELATED APPLICATION

This application claims priority to and the benefit of U.S. Provisional Application No. 61/895,304, filed on Oct. 24, 2013 in the U.S. Patent and Trademark Office, the entire content of which is incorporated herein by reference.

BACKGROUND

1. Field

Embodiments of the present invention relate generally to a rechargeable battery.

2. Description of the Related Art

A rechargeable battery is a battery that can be recharged and discharged, unlike a primary battery that is not designed to be recharged. A low capacity rechargeable battery is used in a small electronic portable device such as a mobile phone, a laptop computer, and a camcorder. A large capacity battery is extensively used to provide power for motor driving in a hybrid vehicle.

Recently, a high power rechargeable battery including a non-aqueous electrolyte having a high energy density has been developed. The high power rechargeable battery includes a large capacity rechargeable battery in which a plurality of rechargeable batteries are coupled in series in order to use the high power rechargeable battery to drive devices that consume large amounts of electric power, for example, motors such as for electric vehicles.

In addition, one large capacity rechargeable battery generally includes a plurality of rechargeable batteries coupled in series. The rechargeable battery may have cylindrical and/or angular shapes.

When an extraordinary reaction occurs to increase a pressure in a rechargeable battery having a case formed of a material such as metal, there is a risk of explosion or ignition of the rechargeable battery.

The above information disclosed in this Background section is only for enhancement of understanding of the background of the described technology and therefore it may contain information that does not form the prior art that is already known to a person of ordinary skill in the art.

SUMMARY

An example embodiment provides a rechargeable battery in which a fuse unit is easily (or quickly) melted during a short circuit.

According to an embodiment of the present invention, there is provided a rechargeable battery including: an electrode assembly including a first electrode and a second electrode; a case containing the electrode assembly; a cap plate covering an opening of the case; a first terminal protruding outside of the case and electrically coupled to the first electrode; a second terminal protruding outside of the case and electrically coupled to the second electrode; a current collector including a first fuse unit and a second fuse unit, and electrically coupled to the first electrode, wherein the first fuse unit and the second fuse unit each have a cross-sectional area smaller than a cross-sectional area of an adjacent region and are spaced from each other; and a connector coupled to the current collector between the first fuse unit and the second fuse unit, and adapted to electrically couple the cap plate and the current collector, wherein a resistance of the connector is less than that of the first terminal.

The current collector further includes: an electrode coupler adapted to electrically couple the collector to the first electrode; and a terminal opening adapted to electrically couple the collector to the first terminal, wherein the first fuse unit and the second fuse unit are between the electrode coupler and the terminal opening.

The rechargeable batteries may be electrically coupled to each other in parallel, wherein when the first and the second electrodes are electrically coupled by a short circuit, a first portion of a short circuit current may flow to the first electrode from the second electrode via the connector and the second fuse unit, and a second portion of the short circuit current may flow to the first terminal from the second electrode via the connector and the first fuse unit, and wherein the second portion of the short circuit current is greater than the first portion of the short circuit current.

A battery module may include the rechargeable battery and at least one other rechargeable battery, the rechargeable batteries may be electrically coupled to each other in parallel, and when the first and the second electrodes are electrically coupled by a short circuit, a first portion of a short circuit current may flow to the first electrode from the second electrode via the connector and the second fuse unit, and a second portion of the short circuit current may flow to the first terminal from the second electrode via the connector and the first fuse unit, and the second portion of the short circuit current may be greater than the first portion of the short circuit current.

The current collector may further include: an upper plate; and a side plate bent from the upper plate.

The first and second fuse units may be at the upper plate.

The first and second fuse units may have fuse openings at centers of the first and second fuse units, respectively.

The first and second fuse units may have fuse grooves at sides of the first and second fuse units, respectively.

The connector may have ends that are bent.

The first fuse unit may be at the upper plate and the second fuse unit may be at the side plate such that the second fuse unit is further from the cap plate than the first fuse unit.

The first fuse unit may have a fuse opening at its center, and the second fuse unit may have fuse grooves at sides of the second fuse unit such that the second fuse unit has a cross-sectional area that is smaller than that of the first fuse unit.

The rechargeable battery may further include a short circuit member adapted to cause short circuit current to flow through the first and second fuse units.

The first and second fuse units may be configured to melt before the short circuit member in response to the short circuit current.

The connector may be smaller than the first terminal.

The first terminal and the cap plate may be insulated from each other by a terminal insulator.

A battery module may include the rechargeable battery and at least one other rechargeable battery, and the rechargeable batteries may be electrically coupled to each other in series.

According to the example embodiment of the present invention, since a connection member is provided between a first fuse unit and a second fuse unit, even though rechargeable batteries are coupled in parallel, it is possible to easily (or quickly) melt a fuse unit by using a current dispersed when a short circuit occurs.

DETAILED DESCRIPTION

Figure 1:
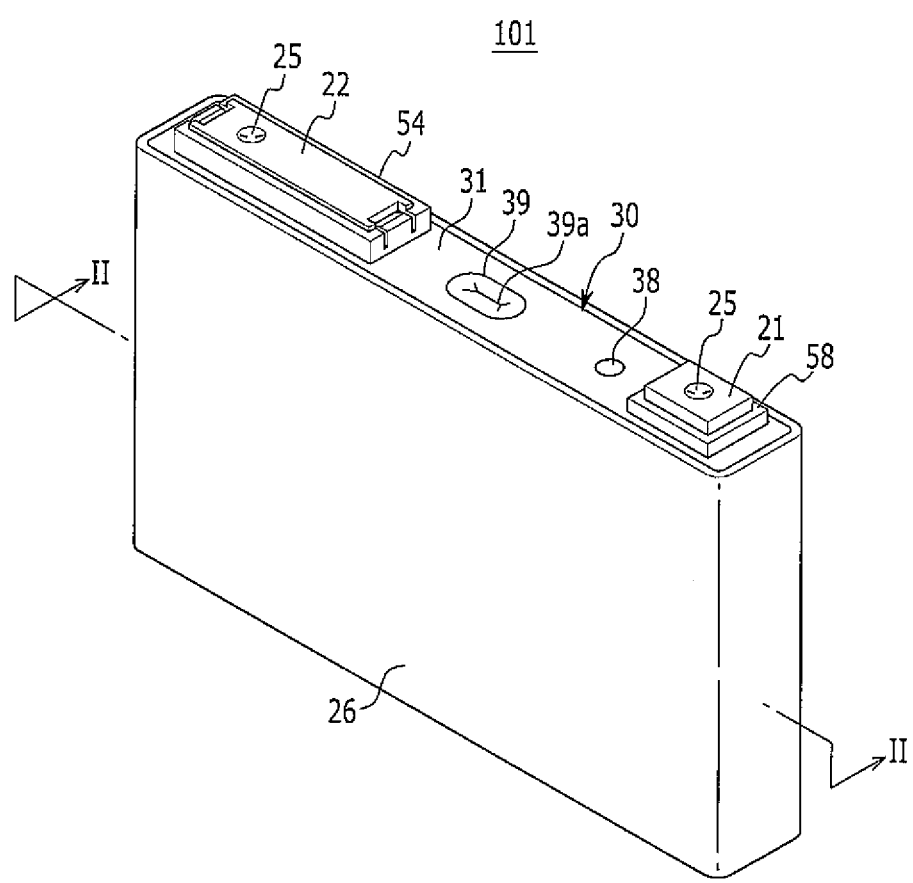
FIG. 1 is a perspective view illustrating a rechargeable battery according to an example embodiment of the present invention.

Hereinafter, example embodiments of the present invention will be described in detail with reference to the accompanying drawings so that those skilled in the art may easily practice embodiments of the present invention. As those skilled in the art would realize, the described embodiments may be modified in various different ways, all without departing from the spirit or scope of embodiments of the present invention. Like reference numerals designate like elements throughout the specification and the drawings.

Figure 2:
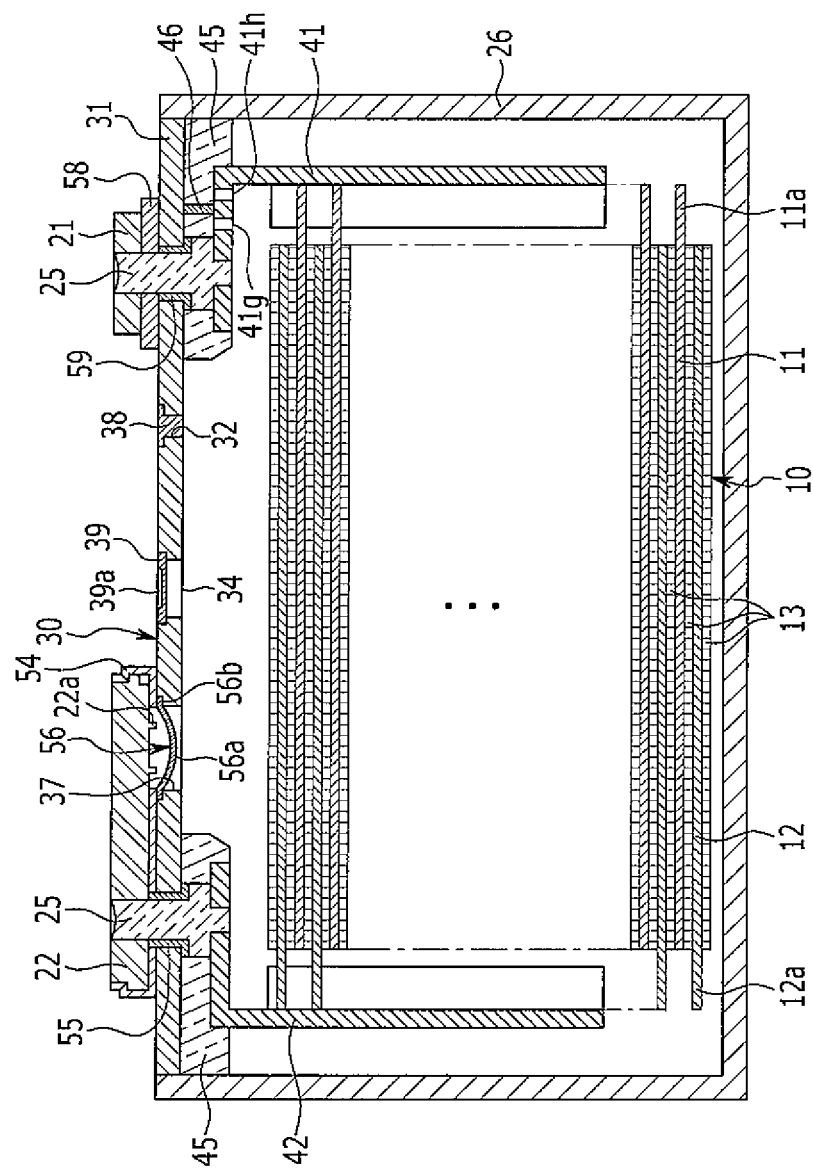
FIG. 2 is a cross-sectional view of the rechargeable battery taken along the line II-II of FIG. 1.

FIG. 1 is a perspective view illustrating a rechargeable battery according to an example embodiment of the present invention. FIG. 2 is a cross-sectional view of the rechargeable battery taken along the line II-II of FIG. 1.

Referring to FIGS. 1 and 2, a rechargeable battery 101 according to the present example embodiment includes an electrode assembly 10 wound with an interposing separator 13 between a positive electrode (first electrode) 11 and a negative electrode (second electrode) 12, a case 26 receiving the electrode assembly 10, and a cap assembly 30 fastened to an opening of the case 26.

The rechargeable battery 101 according to the present example embodiment will be described with reference to an example of an angular shape (e.g., a prismatic shape) such as a lithium ion rechargeable battery. However, the present invention is not limited thereto, and may be applied to various types of batteries such as a lithium polymer battery or a cylindrical battery.

The positive electrode 11 and the negative electrode 12 include a coated region as a region in which an active material is applied at a current collector formed of metal foil of a thin plate and uncoated regions 11a and 12a as regions in which the active material is not applied. A positive electrode uncoated region 11a is formed at a side end of the positive electrode 11 in a length direction of the positive electrode 11. A negative electrode uncoated region 12a is formed at another side end of the negative electrode 12 in a length direction of the negative electrode 12. In addition, the positive electrode 11 and the negative electrode 12 are wound after a separator 13 as an insulator is interposed therebetween.

However, the present invention is not limited thereto, and the electrode assembly 10 may have a structure where the positive electrode and the negative electrode including a plurality of sheets are layered while the separator is interposed therebetween.

The case 26 has an approximately cuboid shape, and an opening is formed at a side thereof. The case 26 may be formed of metal such as aluminum and/or stainless steel.

The cap assembly 30 includes a cap plate 31 covering the opening of the case 26, a first terminal 21 protruding toward the outside of the cap plate 31 and electrically coupled to the positive electrode 11, and a second terminal 22 protruding toward the outside of the cap plate 31 and electrically coupled to the negative electrode 12.

The cap plate 31 has a shape of an elongated plate extending in one direction, and is fastened to the opening of the case 26. A sealing stopper 38 provided in an electrolyte injection opening 32 and a vent plate 39 provided in a vent opening (or vent opening) 34, in which a notch 39a is formed to be opened at a certain pressure (e.g., a predetermined pressure), are provided in the cap plate 31. The first terminal 21 and the second terminal 22 are provided to protrude over the cap plate 31.

The first terminal 21 is electrically coupled to the positive electrode 11 via a first current collecting member (e.g., a first current collector) 41. The second terminal 22 is electrically coupled to the negative electrode 12 via a second current collecting member (e.g., a second current collector) 42. However, the present invention is not limited thereto, the first terminal 21 may be electrically coupled to the negative electrode, and the second terminal 22 may be electrically coupled to the positive electrode.

The first terminal 21 has a rectangular plate shape. The first terminal 21 is electrically coupled to the positive electrode 11 via a connection terminal 25 adhering to (e.g., attached to) the first current collecting member 41. The connection terminal 25 fastened to the first terminal 21, and the connection terminal 25 fastened to the second terminal 22 have the same structure.

A sealing gasket 59 for sealing is provided between the first terminal 21 and the cap plate 31 to be inserted into an opening (or a hole) through which the terminal is provided. A lower insulating member 45 insulating the first terminal 21 and the first current collecting member 41 from the cap plate 31 is provided under the cap plate 31.

A terminal insulating member 58 electrically insulating the first terminal 21 and the cap plate 31 is provided on a lower portion of the first terminal 21. Further, the cap plate 31 is electrically coupled to the first current collecting member 41 via a connection member 46 adhering to (e.g., attached to) the first current collecting member 41. The connection member 46 has a plate shape. A lower end of the connection member 46 is welded to the first current collecting member 41, and an upper end of the connection member 46 is welded to the cap plate 31.

Accordingly, both the first terminal 21 and the cap plate 31 are electrically coupled to the first current collecting member 41, but are not directly coupled to the first terminal 21 and the cap plate 31. That is, the first terminal 21 is electrically coupled to the first current collecting member 41 via the connection terminal 25. The cap plate 31 is electrically coupled to the first current collecting member 41 via the connection member 46.

The second terminal 22 has a rectangular plate shape. The second terminal 22 is electrically coupled to the negative electrode 12 via the connection terminal 25 adhering to (e.g., attached to) the second current collecting member 42. The connection terminal 25 is provided through the cap plate 31 and the second terminal 22 so that an upper end thereof is fixed to the second terminal 22.

A sealing gasket 55 for sealing is provided between the second terminal 22 and the cap plate 31 to be inserted into the opening (or hole) through which the terminal is provided. A lower insulating member 45 insulating the second terminal 22 and the second current collecting member 42 from the cap plate 31 is provided under the cap plate 31.

A short-circuit protrusion 22a protruding toward a short-circuit opening (e.g., short-circuit hole) 37 is formed at a lower portion of the second terminal 22. The second terminal 22 longitudinally extends in one direction to cover the short-circuit opening 37. An upper insulating member 54 electrically insulating the second terminal 22 and the cap plate 31 is provided between the second terminal 22 and the cap plate 31.

The cap assembly 30 includes a short-circuit member 56 short-circuiting the positive electrode 11 and the negative electrode 12. The short-circuit member 56 is electrically coupled to the cap plate 31 and deformed when internal pressure of the rechargeable battery 101 is increased so as to be coupled to the second terminal 22.

The short-circuit opening 37 is formed through the cap plate 31. The short-circuit member 56 is between the upper insulating member 54 and the cap plate 31 in the short-circuit opening 37. The short-circuit member 56 includes a curved unit 56a curved in an arc form to be convex downwardly, and an edge unit 56b formed on an outside of the curved unit 56a and fixed to (e.g., coupled to) the cap plate 31.

When gas is generated due to an extraordinary reaction in the rechargeable battery, the internal pressure of the rechargeable battery is increased. When the internal pressure of the rechargeable battery is higher than a certain pressure (e.g., a predetermined pressure), the curved unit 56a is deformed to be convex upwardly. In this case, the short-circuit protrusion 22a and the short-circuit member 56 come into contact with each other to cause a short circuit.

Figure 3:
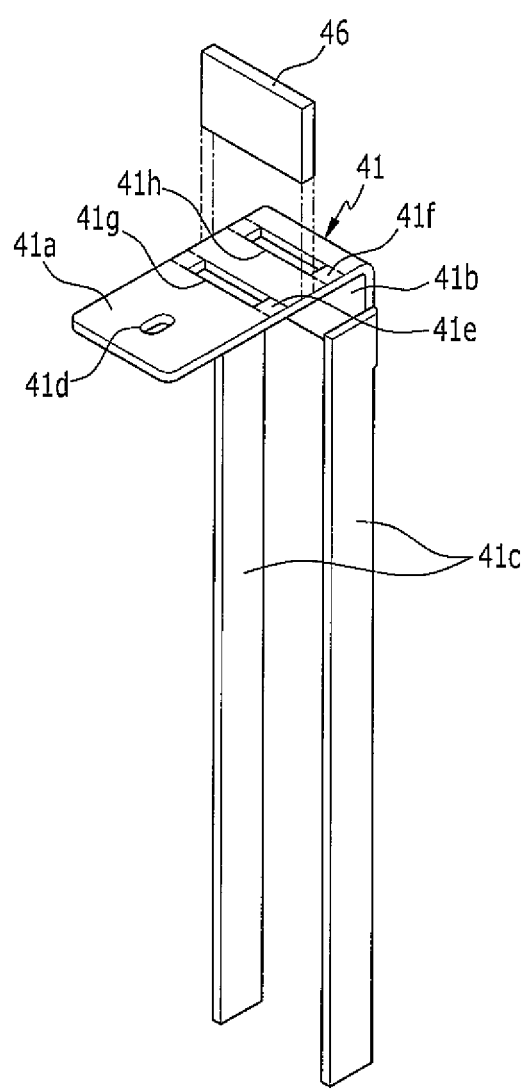
FIG. 3 is an exploded perspective view illustrating a first current collector and a connector according to the example embodiment of the present invention shown in FIG. 2.

FIG. 3 is an exploded perspective view illustrating the first current collector and the connector according to the example embodiment of the present invention shown in FIG. 2.

Referring to FIG. 3, the first current collecting member 41 includes an upper plate 41a adhering to (e.g., attached to) the connection terminal 25, a side plate 41b bent from the upper plate 41a and extending downwardly to the electrode assembly 10, and two current collecting shoes 41c formed to be coupled to the side plate 41b and adhere to (e.g., attached to) the electrode assembly 10.

The upper plate 41a has a quadrangular plate shape, and may be fixed to a lower portion of the connection terminal 25 by welding. A fastening opening (e.g., a fastening hole) 41d is formed through the upper plate 41a. While a protrusion formed at the lower portion of the connection terminal 25 is inserted into the fastening opening 41d, the connection terminal 25 and the upper plate 41a may be welded. Accordingly, the fastening opening 41d becomes a terminal adhesion unit (e.g., terminal connection unit) electrically coupled to the first terminal.

The side plate 41b is formed to be bent downwardly from an end of a side of the upper plate to the bottom of the case 26. The two current collecting shoes (e.g., current collecting terminals) 41c are formed to be bent from the ends of both sides of the side plate 41b, and may adhere to (e.g., attach to) the positive electrode 11 by welding while being parallel to the uncoated region of the positive electrode 11. Accordingly, the current collecting shoe 41c becomes an electrode adhesion unit (e.g., electrode connection unit) electrically coupled to the positive electrode 11. The two electrode assemblies 10 are in the case 26. The current collecting shoes 41c adhere to (e.g., attach to) the positive electrode uncoated regions 11a of the different electrode assemblies 10.

A first fuse unit 41e and a second fuse unit 41f having a cross-sectional area that is smaller than that of a periphery (e.g., an adjacent region) are formed in the upper plate 41a. The first fuse unit 41e and the second fuse unit 41f are between the terminal adhesion unit and the electrode adhesion unit. A fuse opening 41g is formed through the first fuse unit 41e, and thus the first fuse unit 41e has a longitudinal cross-sectional area that is smaller than that of a periphery. The fuse opening 41g is positioned at the center of the first fuse unit 41e. The first fuse unit 41e is formed to be coupled to ends of both sides of the fuse opening 41g.

Further, a fuse opening 41h is formed through the second fuse unit 41f, and thus the second fuse unit 41f has a longitudinal cross-sectional area that is smaller than that of a periphery (e.g., an adjacent region). The fuse opening 41h is positioned at the center of the second fuse unit 41f. The second fuse unit 41f is formed to be coupled to ends of both sides of the fuse opening 41h.

The first fuse unit 41e and the second fuse unit 41f are spaced apart from each other. The connection member 46 may adhere to (e.g., attach to) the first current collecting member 41 by welding between the first fuse unit 41e and the second fuse unit 41f. The first fuse unit 41e is positioned between the fastening opening 41d and the connection member 46. The second fuse unit 41f is positioned between the current collecting shoe 41c and the connection member 46. Accordingly, a current sequentially passes through the current collecting shoe 41c, the second fuse unit 41f, and the connection member 46, and is then transferred to the cap plate 31. Further, the current sequentially passes through the current collecting shoe 41c, the second fuse unit 41f, and the first fuse unit 41e, and is then transferred to the first terminal 21.

Figure 4A:
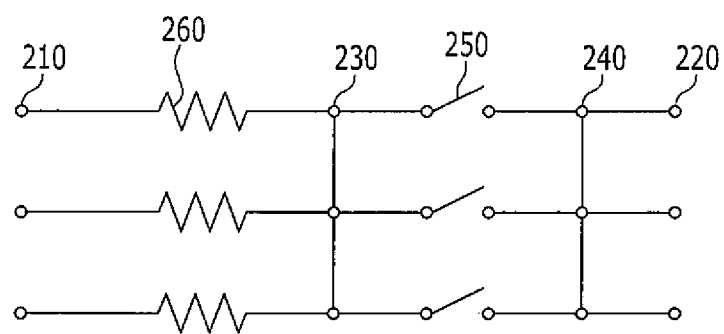
FIG. 4A is a circuit diagram illustrating a state where rechargeable batteries are coupled in parallel.
Figure 4B:
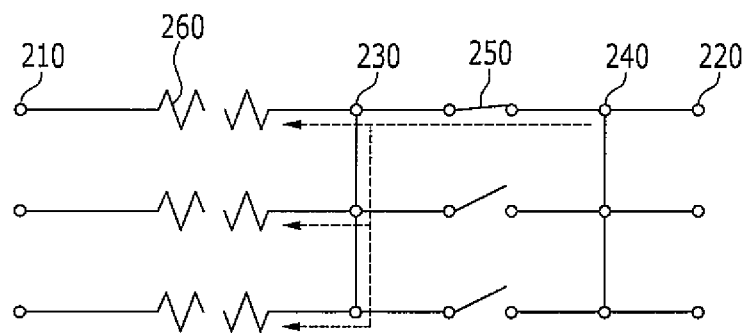
FIG. 4B is a circuit diagram illustrating occurrence of a short circuit in a state where the rechargeable batteries are coupled in parallel.

FIG. 4A is a circuit diagram illustrating a state where rechargeable batteries are coupled in parallel. FIG. 4B is a circuit diagram illustrating occurrence of a short circuit in a state where the rechargeable batteries are coupled in parallel.

Referring to FIGS. 4A and 4B, the rechargeable batteries include a positive electrode 210, a negative electrode 220, a positive electrode terminal 230 electrically coupled to the positive electrode 210, and a negative electrode terminal 240 electrically coupled to the negative electrode 220. Further, a short-circuit member 250 electrically coupling the positive electrode 210 and the negative electrode 220 by deformation is provided between the positive electrode terminal and the negative electrode terminal. A fuse unit 260 melted when an over current flows to block a current is formed between the positive electrode 210 and the positive electrode terminal 230.

When the short-circuit member 250 is deformed to electrically couple the positive electrode terminal 230 and the negative electrode terminal 240, a short-circuit current flows to be dispersed through the positive electrode terminal 230 to each rechargeable battery. Accordingly, a short-circuit current that is smaller than the short-circuit current flowing through one rechargeable battery flows through the fuse unit 260.

Figure 5:
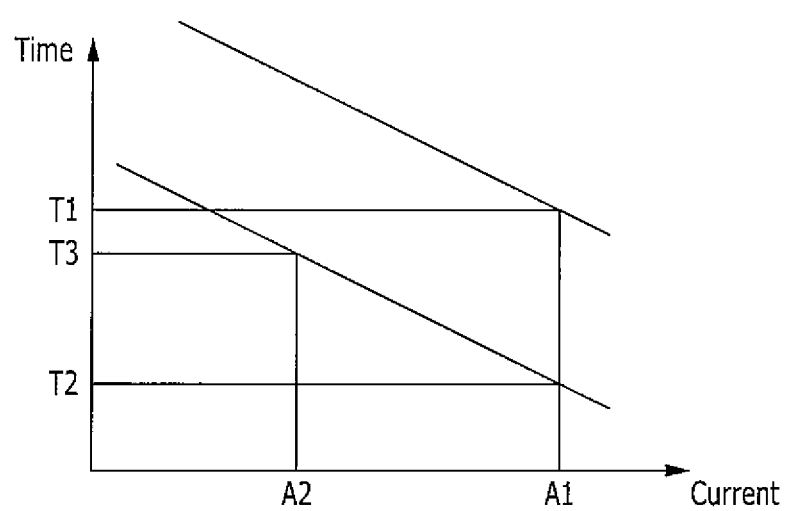
FIG. 5 is a graph illustrating a time at which a short-circuit member is melted and a time at which a fuse unit is melted according to magnitude of a current.

FIG. 5 is a graph illustrating a time at which a short-circuit member is melted and a time at which a fuse unit is melted according to magnitude of a current.

As shown in FIG. 5, when a short-circuit current A1 flows through one fuse unit 260, a time at which the fuse unit 260 is melted becomes T2, and a time at which the short-circuit member 250 is melted becomes T1. When the short-circuit member 250 causes the short circuit, an over current flows through the short-circuit member 250, and thus the short-circuit member 250 as well as the fuse unit 260 is melted.

When a time difference between T1 and T2 is large, after the fuse unit 260 is melted, a short-circuit state may be removed to stably maintain the rechargeable battery. When the difference between T1 and T2 is small, there is a concern regarding melting of the short-circuit member 250 before the fuse unit 260 is melted. When the short-circuit member 250 is first melted, the fuse unit 260 is not melted, and the short circuit is removed while the rechargeable battery is not electrically blocked, and thus the rechargeable battery still remains in a dangerous state.

When the rechargeable batteries are coupled in parallel, the short-circuit current is dispersed, and thus a smaller amount of short-circuit current A2 flows through the fuse unit 260. In this case, a difference between the time T1 at which the short-circuit member 250 is melted and a time T3 at which the fuse unit 260 is melted is reduced. This is because a large amount of short-circuit current A1 flows through the short-circuit member 250 but the short-circuit current A2 flows in an amount that is smaller than that of the short-circuit current A1 through the fuse unit 260. As described above, when the rechargeable batteries are coupled in parallel, since the difference between T1 and T3 is reduced, a risk of melting the short-circuit member 250 before the fuse unit 260 is melted is increased.

Figure 6A:
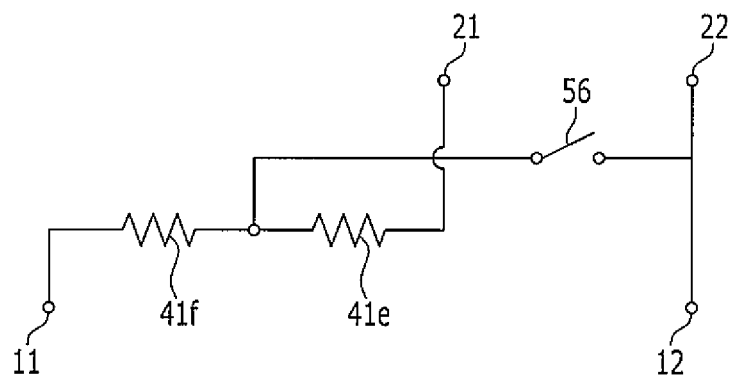
FIG. 6A is a circuit diagram of the rechargeable battery according to the example embodiment of the present invention shown in FIG. 2.
Figure 6B:
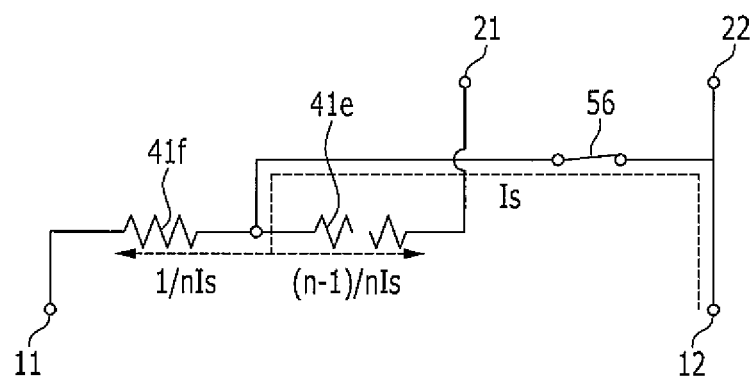
FIG. 6B is a circuit diagram illustrating occurrence of a short circuit in the rechargeable battery according to the example embodiment of the present invention shown in FIG. 2.

FIG. 6A is a circuit diagram of the rechargeable battery according to the example embodiment of the present invention shown in FIG. 2. FIG. 6B is a circuit diagram illustrating occurrence of a short circuit in the rechargeable battery according to the example embodiment of the present invention shown in FIG. 2.

Referring to FIG. 6, according to the present example embodiment, the first terminal 21 and the short-circuit member 56 are not directly coupled, but the short-circuit member 56 is electrically coupled to the first terminal 21 via the first fuse unit 41e. Further, the short-circuit member 56 is electrically coupled to the positive electrode 11 via the second fuse unit 41f.

Accordingly, when the short-circuit member 56 is inversely deformed, the short-circuit current moves to the first terminal 21 through the first fuse unit 41e, and moves to the positive electrode 11 through the second fuse unit 41f.

When n rechargeable batteries are coupled in parallel, 1/n of the short-circuit current Is flows through the second fuse unit 41f, and n−1/n of the short-circuit current Is flows through the first fuse unit 41e. Since a larger amount of current flows through the first fuse unit 41e, the first fuse unit 41e is first melted. When the first fuse unit 41e is melted, since the whole short-circuit current moves to the second fuse unit 41f, the second fuse unit 41f is melted.

When the n rechargeable batteries are coupled in parallel, n−1/n of the short-circuit current flows through the first fuse unit 41e, and the first fuse unit 41e may be easily melted (e.g., quickly melted) as the number of rechargeable batteries coupled in parallel is increased. However, when the n rechargeable batteries are coupled in parallel, in conventional rechargeable batteries, since 1/n of the short-circuit current flows through the fuse unit, the fuse unit is not easily melted (e.g., not quickly melted). When two rechargeable batteries are coupled in parallel, the same amount of current flows through the first fuse unit 41e and the second fuse unit 41f, and thus the first fuse unit 41e and the second fuse unit 41f may be concurrently (e.g., simultaneously) melted.

As described above, according to the present example embodiment, the first terminal 21 is insulated from the cap plate 31, the first fuse unit 41e is positioned between the first terminal 21 and the connection member 46, and the second fuse unit 41f is positioned between the connection member 46 and the electrode assembly 10. Therefore, the first fuse unit 41e and the second fuse unit 41f may be easily melted (e.g., quickly melted) when the short circuit occurs. Further, even though the second fuse unit 41f is melted later as compared to the first fuse unit 41e, a larger amount of short-circuit current flows for a short time as compared to the conventional fuse units. Therefore, a melting time of the fuse unit is reduced as compared to the fuse units that are known in the art.

Accordingly, if there is an internal short circuit in the rechargeable battery according to the present embodiment, the short circuit current travels from the cap plate 31 through the connection member 46, through the second fuse unit 41f, and to the positive electrode 11 such that it forms a single short circuit current path.

According to embodiments of the present invention, the connection member 46 may have a lower resistance than that of the first terminal 21. For example, the connection member 46 may be made from a material that has a lower resistance than that of the first terminal 21, or the connection member 46 may have a smaller size than that of the first terminal 21.

If the first terminal 21 and the cap plate 31 are not insulated from each other and are electrically coupled to each other, the short circuit current travels through the cap plate 31 and the first terminal 21, and will flow to the second fuse unit 41f. However, according to embodiments of the present invention, the first terminal 21 and the cap plate 31 are insulated from each other by the terminal insulation member 58, such that the short circuit current will not go through the first terminal 21, but will go through the connection member 46 and through the second fuse unit 41f to the positive electrode 11.

Because the resistance of the connection member 46 is less than the resistance of the first terminal 21, more current would flow through the connection member 46 than through the first terminal 21. Therefore, the current that goes through the connection member 46 and to the second fuse unit 41f is more than the current that would go through the first terminal 21 and to the second fuse member 41f. In other words, the current that would go through the first terminal 21 and to the second fuse unit 41f is less than the current that goes through the connection member 46 and to the second fuse unit 41f.

In addition, according to the present embodiment as shown in FIG. 2, the connection member 46 is configured such that the short circuit current path that goes through the connection member 46 and to the second fuse unit 41f is shorter than the short circuit current path that would go through the first terminal 21 and to the second fuse unit 41f. Therefore, according to the present embodiment, the short circuit current path or the length of the short circuit current path is decreased (e.g., minimized) such that the consumption of the short circuit current through the short circuit current path is decreased (e.g., minimized).

Therefore, according to the present embodiment, the cap plate 31 and the collector are electrically coupled through the connection member 46 such that the short circuit current that is consumed prior to going through the second fuse unit 41f is reduced (e.g., minimized) such that the short circuit current that goes through the second fuse unit 41f is increased (e.g., maximized) such that in case there is an internal short circuit within the secondary battery, the second fuse unit 41f is melted before the short circuit member 56.

In addition, by electrically coupling n secondary batteries in parallel and in the case of an internal short circuit in the secondary battery, the short circuit current flows from the cap plate 31 through the connection member 46 to the current collector. Out of that current, a portion 1/n flows through the second fuse unit 41f and to the positive electrode 11, and the remaining short circuit current n−1/n flows through the first fuse unit 41e to the first terminal 21 and to other secondary batteries that are coupled in parallel to the secondary battery such that two short circuit current paths are formed.

When there is a short circuit in the secondary battery coupled to a plurality of secondary batteries in parallel, it is different from when there is a short circuit in a single rechargeable battery. Because of the connection member 46, there are two short circuit current paths such that the short circuit current of n−1/n flows outside of the secondary battery through the first fuse unit 41e such that the first fuse unit 41e is melted prior to the short circuit member 56.

Therefore, according to embodiments of the present invention, because of the connection member 46, and in a single rechargeable battery or in a plurality of rechargeable batteries in parallel in the battery module, the fuse units are melted prior to the short circuit member 56 because of the formation of the short circuit current path.

In addition, in a secondary battery module including a single rechargeable battery the current path that is similar to the single rechargeable battery can be formed in each rechargeable battery.

Embodiments of the present invention are not limited to the single rechargeable battery in parallel, but also battery modules that include single rechargeable batteries in series.

Figure 7:
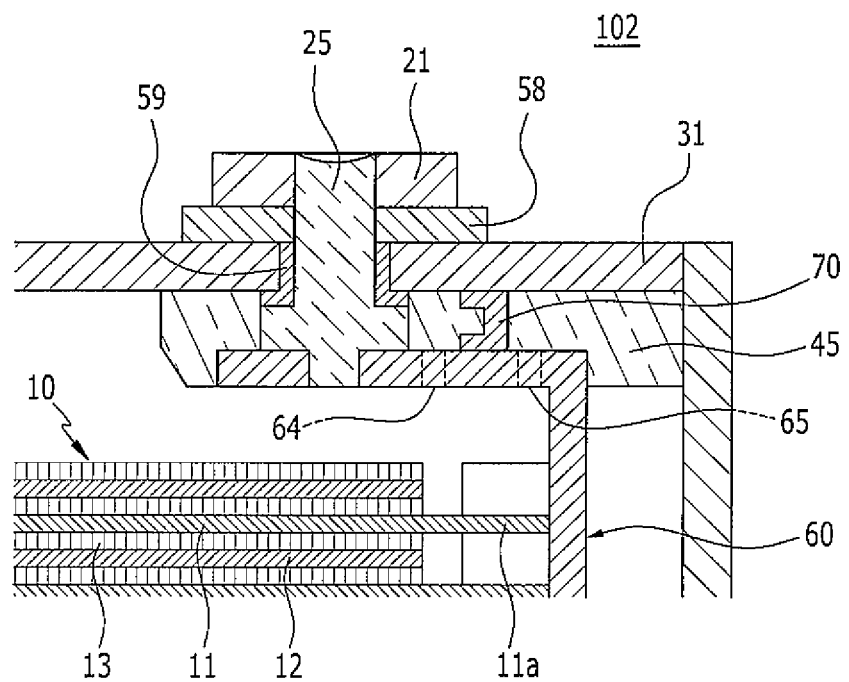
FIG. 7 is a cross-sectional view illustrating a portion of a rechargeable battery according to another example embodiment of the present invention.
Figure 8:
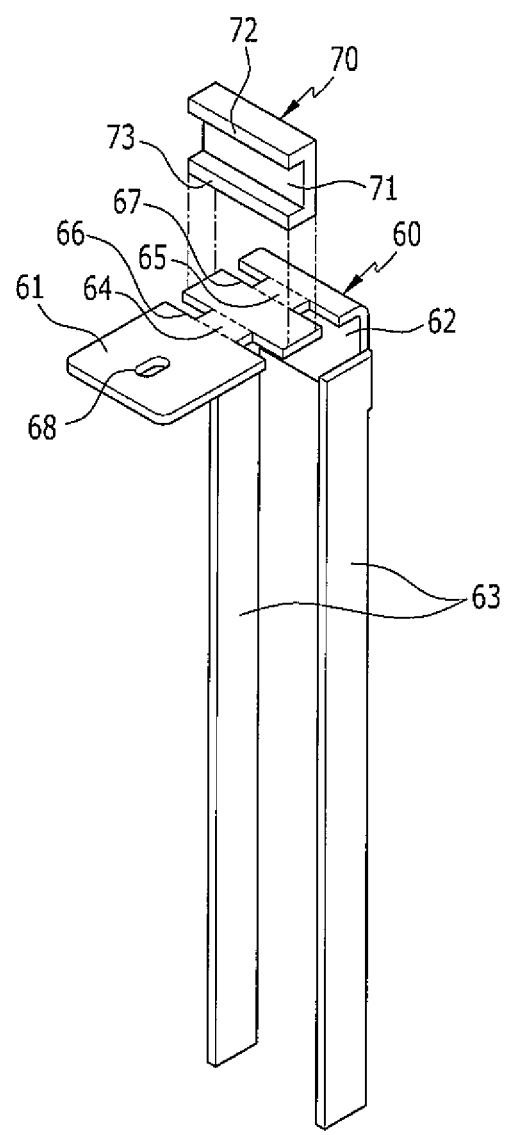
FIG. 8 is an exploded perspective view illustrating a current collector and a connector according to the example embodiment of the present invention shown in FIG. 7.

FIG. 7 is a cross-sectional view illustrating a portion of a rechargeable battery according to another example embodiment of the present invention. FIG. 8 is an exploded perspective view illustrating a current collector and a connector of the rechargeable battery according to the example embodiment of the present invention shown in FIG. 7.

Referring to FIGS. 7 and 8, since a rechargeable battery 102 according to the present embodiment has a similar structure as the rechargeable battery according to the example embodiment shown in FIGS. 2 and 3 with the exception of the structure of a first current collecting member 60 and a connection member 70, an overlapping description of the similar structure will be omitted.

The first current collecting member 60 is electrically coupled to the positive electrode 11 of the electrode assembly 10. The connection terminal 25 and the connection member 70 are provided to be fixed (e.g., attached) to the first current collecting member 60. The connection terminal 25 electrically couples the first current collecting member 60 and the first terminal 21. The connection member 70 electrically couples the first current collecting member 60 and the cap plate 31. The terminal insulating member 58 is provided between the first terminal 21 and the cap plate 31, and thus the first terminal 21 and the cap plate 31 are not directly coupled.

The connection member 70 has a plate shape. The lower end of the connection member 70 may be welded to the first current collecting member 60, and the upper end of the connection member 70 may be welded to the cap plate 31. The connection member 70 includes a connection tap 71 extending from the first current collecting member 60 in a direction toward the cap plate 31, a first adhesion unit (e.g., a first connection unit) 72 formed to be bent from an end of a side of the connection tap 71, and a second adhesion unit (e.g., a second connection unit) 73 formed to be bent from an end of another side of the connection tap 71.

The first adhesion unit 72 may adhere to (e.g., attach to) the cap plate 31 by welding. The second adhesion unit 73 may adhere to (e.g., attach to) the first current collecting member 60 by welding. When the first adhesion unit 72 and the second adhesion unit 73 are formed like the present example embodiment, the connection member 70 may be stably fixed to (e.g., coupled to) the first current collecting member 60 and the cap plate 31.

The first current collecting member 60 includes an upper plate 61 adhering to (e.g., attached to) the connection terminal 25, a side plate 62 extending from the upper plate 61 and bent downwardly to the electrode assembly 10, and two current collecting shoes (e.g., current collecting terminals) 63 formed to be coupled to the side plate 62 and adhere to (e.g., attach to) the electrode assembly 10.

The upper plate 61 has a quadrangular plate shape, and may be fixed to (e.g., coupled to) the lower portion of the connection terminal 25 by welding. A fastening opening 68 is formed through the upper plate 61. While a protrusion formed at the lower portion of the connection terminal 25 is inserted into the fastening opening 68, the connection terminal 25 and the upper plate 61 may be welded. Accordingly, the fastening opening 68 becomes a terminal adhesion unit (e.g., a terminal connection unit) electrically coupled to the first terminal 21.

The side plate 62 is formed to be bent downward from an end of a side of the upper plate 61 to the bottom of the case 26. The two current collecting shoes 63 are formed to be coupled to the side plate 62. The current collecting shoes 63 are formed to be bent from the ends of both sides of the side plate 62, and may adhere to (e.g., attach to) the positive electrode 11 by welding while being parallel to the uncoated region of the positive electrode 11. Accordingly, the current collecting shoe 63 becomes an electrode adhesion unit (e.g., an electrode connection unit) electrically coupled to the positive electrode 11. The two electrode assemblies 10 are in the case 26. The current collecting shoes 63 adhere to (e.g., attach to) the positive electrode uncoated regions 11a of the different electrode assemblies 10.

A first fuse unit 64 and a second fuse unit 65 having a cross-sectional area that is smaller than that of a periphery (e.g., an adjacent region) are formed in the upper plate 61. The first fuse unit 64 and the second fuse unit 65 are between the terminal adhesion unit and the electrode adhesion unit. A fuse groove 66 is formed at the first fuse unit 64, and thus the first fuse unit 64 has a longitudinal cross-sectional area that is smaller than that of a periphery (e.g., an adjacent region). The fuse groove 66 is formed to extend from an end of a side of the upper plate 61 to an inside thereof. The fuse groove 66 is formed to be coupled to both ends of the first fuse unit 64. The first fuse unit 64 is positioned between the fuse grooves 66.

Further, a fuse groove 67 is formed at the second fuse unit 65, and thus the second fuse unit 65 has a longitudinal cross-sectional area that is smaller than that of a periphery (e.g., an adjacent region). The fuse groove 67 is formed to extend from the end of the side of the upper plate 61 to the inside thereof. The fuse groove 67 is formed to be coupled to both ends of the second fuse unit 65. The second fuse unit 65 is positioned between the fuse grooves 67.

The first fuse unit 64 and the second fuse unit 65 are spaced apart from each other. The connection member 70 may adhere to (e.g., attach to) the first current collecting member 60 by welding between the first fuse unit 64 and the second fuse unit 65. The first fuse unit 64 is positioned between the fastening opening 68 and a portion to which the connection member 70 adheres (e.g., attaches). The second fuse unit 65 is positioned between the current collecting shoe 63 and a portion to which the connection member 46 adheres (e.g., attaches). Accordingly, the first terminal 21 is electrically coupled to the connection member 70 via the first fuse unit 64. The electrode assembly 10 is electrically coupled to the connection member 70 via the second fuse unit 65.

Figure 9:
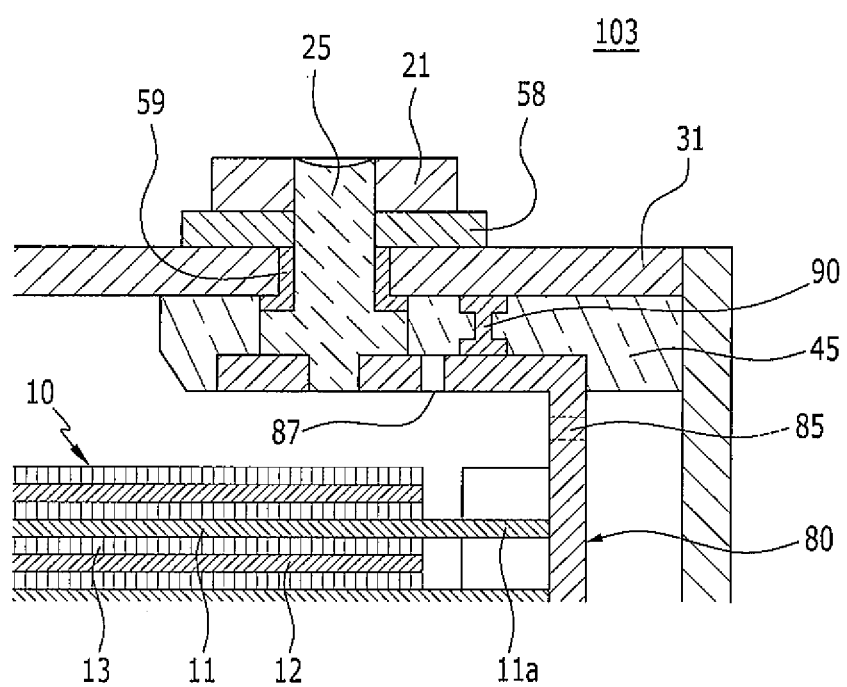
FIG. 9 is a cross-sectional view illustrating a portion of a rechargeable battery according to another example embodiment of the present invention.
Figure 10:
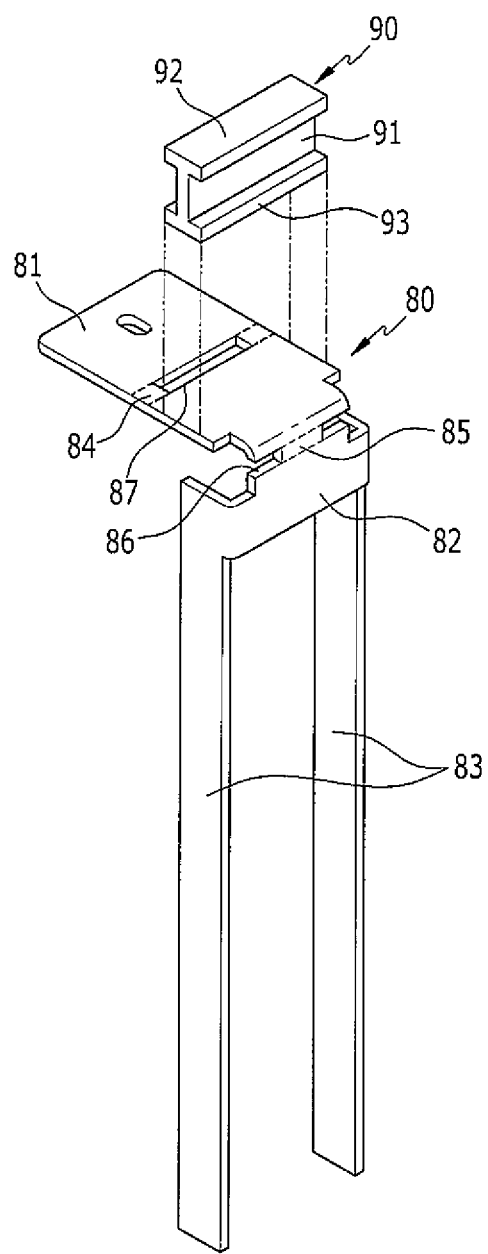
FIG. 10 is an exploded perspective view illustrating a current collector and a connector according to the example embodiment of the present invention shown in FIG. 9.

FIG. 9 is a cross-sectional view illustrating a portion of a rechargeable battery according to another example embodiment of the present invention. FIG. 10 is an exploded perspective view illustrating a current collector and a connector according to the example embodiment of the present invention shown in FIG. 9.

Referring to FIGS. 9 and 10, since a rechargeable battery 103 according to the present example embodiment has a similar structure as the rechargeable battery according to the example embodiment shown in FIGS. 2 and 3 with the exception of the structure of a first current collecting member (e.g., a first current collector) 80 and a connection member (e.g., a connector) 90, an overlapping description of the similar structures will be omitted.

The first current collecting member 80 is electrically coupled to the positive electrode 11 of the electrode assembly 10. The connection terminal 25 and the connection member 90 are provided to be fixed to (e.g., coupled to) the first current collecting member 80. The connection terminal 25 electrically couples the first current collecting member 80 and the first terminal 21. The connection member 90 electrically couples the first current collecting member 80 and the cap plate 31. The terminal insulating member 58 is provided between the first terminal 21 and the cap plate 31, and thus the first terminal 21 and the cap plate 31 are not directly coupled.

The connection member 90 has a plate shape. A lower end of the connection member 90 may be welded to the first current collecting member 80, and an upper end of the connection member 90 may be welded to the cap plate 31. The connection member 90 includes a connection tap 91 extending from the first current collecting member 80 in a direction toward the cap plate 31, a first flange unit 92 formed to protrude from an end of a side of the connection tap 91 in a lateral direction, and a second flange unit 93 formed to protrude from an end of another side of the connection tap 91 in the lateral direction.

The first flange unit 92 may adhere to (e.g., attach to) the cap plate 31 by welding. The second flange unit 93 may adhere to (e.g., attach to) the first current collecting member 80 by welding. When the first flange unit 92 and the second flange unit 93 are formed at the connection member 90 as shown in the present example embodiment, the connection member 90 may be stably fixed to (e.g., coupled to) the first current collecting member 80 and the cap plate 31.

The first current collecting member 80 includes an upper plate 81 adhering to (e.g., attached to) the connection terminal 25, a side plate 82 extending from the upper plate 81 and bent downward to the electrode assembly 10, and two current collecting shoes 83 (e.g., current collecting terminals) formed to be coupled to the side plate 82 and adhere to (e.g., attach to) the electrode assembly 10.

The upper plate 81 has a quadrangular plate shape, and may be fixed to (e.g., coupled to) the lower portion of the connection terminal 25 by welding. A fastening opening 88 is formed through the upper plate 81. While a protrusion formed at the lower portion of the connection terminal 25 is inserted into the fastening opening 88, the connection terminal 25 and the upper plate 81 may be welded. Accordingly, the fastening opening 88 becomes a terminal adhesion unit (e.g., a terminal connection unit) electrically coupled to the first terminal 21.

The side plate 82 is formed to be bent downward from an end of a side of the upper plate 81 to the bottom of the case 26. The two current collecting shoes 83 are formed to be coupled to the side plate 82. The current collecting shoes 83 are formed to be bent from the ends of both sides of the side plate 82, and may adhere to (e.g., attach to) the positive electrode 11 by welding while being parallel to the uncoated region of the positive electrode 11. Accordingly, the current collecting shoe 83 becomes an electrode adhesion unit electrically coupled to the positive electrode 11. The two electrode assemblies 10 are in the case 26. The current collecting shoes 83 adhere to (e.g., attach to) the positive electrode uncoated regions 11a of the different electrode assemblies 10.

A first fuse unit 84 having a cross-sectional area that is smaller than that of a periphery (e.g., an adjacent region) is formed at the upper plate 81. A second fuse unit 85 having a cross-sectional area that is smaller than that of a periphery (e.g., an adjacent region) is formed at the side plate 82. The first fuse unit 84 and the second fuse unit 85 are between the terminal adhesion unit and the electrode adhesion unit. The first fuse unit 84 is closer to the first terminal 21 as compared to the second fuse unit 85.

A fuse opening 87 is formed through the first fuse unit 84, and thus the first fuse unit 84 has a longitudinal cross-sectional area that is smaller than that of a periphery (e.g., an adjacent region). The fuse opening 87 is at the center of the first fuse unit 84. The first fuse unit 84 is formed to be coupled to ends of both sides of the fuse opening 87.

A fuse groove 86 is formed at the second fuse unit 85, and thus the second fuse unit 85 has a longitudinal cross-sectional area that is smaller than that of a periphery (e.g., an adjacent region). The fuse groove 86 is formed to extend from an end of a side of the side plate 82 to an inside thereof. The fuse groove 86 is formed to be coupled to both ends of the second fuse unit 85. The second fuse unit 85 is positioned between the fuse grooves 86. Further, the second fuse unit 85 is positioned to be lower than the first fuse unit 84, and has a cross-sectional area that is smaller than that of the first fuse unit 84.

The first fuse unit 84 and the second fuse unit 85 are spaced apart from each other. The connection member 90 may adhere to (e.g., attach to) the first current collecting member 80 by welding between the first fuse unit 84 and the second fuse unit 85. The first fuse unit 84 is positioned between the fastening opening 88 and a portion to which the connection member 90 adheres (e.g., attaches). The second fuse unit 85 is positioned between the current collecting shoe 83 and a portion to which the connection member 46 adheres (e.g., attaches). Accordingly, the first terminal 21 is electrically coupled to the connection member 90 via the first fuse unit 84. The electrode assembly 10 is electrically coupled to the connection member 90 via the second fuse unit 85.

When the three or more rechargeable batteries are coupled in parallel, a larger amount of short-circuit current flows through the first fuse unit 84. After the first fuse unit 84 is melted, the short-circuit current is concentrated toward the second fuse unit 85 to melt the second fuse unit 85. Further, according to the present example embodiment, the second fuse unit 85 has a cross-sectional area that is smaller than that of the first fuse unit 84. Therefore, a difference between a time at which the first fuse unit 84 is melted and a time at which the second fuse unit 85 is melted may be decreased (e.g., minimized). Accordingly, the second fuse unit 85 may be stably melted before the short-circuit member is melted.

While this invention has been described in connection with what is presently considered to be practical example embodiments, it is to be understood that the invention is not limited to the disclosed embodiments, but, on the contrary, is intended to cover various modifications and equivalent arrangements included within the scope of the appended claims and equivalents thereof, the detailed description of the invention, and the drawings.

DESCRIPTION OF SYMBOLS 101, 102, 103: rechargeable battery
10: electrode assembly
11: positive electrode
11a: positive electrode uncoated region
12: negative electrode
12a: negative electrode uncoated region
13: separator
21: first terminal
22: second terminal
22a: short-circuit protrusion
25: connection terminal
26: case
30: cap assembly
31: cap plate
37: short-circuit opening
41, 60, 80: first current collecting member
41a, 61, 81: upper plate
41b, 62, 82: side plate
41c, 63, 83: current collecting shoe
41d, 68, 88: fastening opening
41e, 64, 84: first fuse unit
41f, 65, 85: second fuse unit
41g, 41h, 87: fuse opening
66, 67, 86: fuse groove
42: second current collecting member
43, 45: lower insulating member
46, 70, 90: connection member
54: upper insulating member
55, 59: sealing gasket
56: short-circuit member
56a: curved unit
56b: edge unit
58: terminal insulating member
71, 91: connection tap
72: first adhesion unit
73: second adhesion unit
92: first flange unit
93: second flange unit

What is claimed is:

1. A rechargeable battery comprising:
an electrode assembly comprising a first electrode and a second electrode;
a case containing the electrode assembly;
a cap plate covering an opening of the case;
a first terminal protruding outside of the case and electrically coupled to the first electrode;
a second terminal protruding outside of the case and electrically coupled to the second electrode;
a current collector comprising a first fuse unit and a second fuse unit, and electrically coupled to the first electrode, wherein the first fuse unit and the second fuse unit each have a cross-sectional area smaller than a cross-sectional area of an adjacent region and are spaced from each other; and
a connector coupled to the current collector between the first fuse unit and the second fuse unit, and adapted to electrically couple the cap plate and the current collector, wherein a resistance of the connector is less than that of the first terminal.

2. The rechargeable battery of claim 1, wherein the current collector further comprises:
an electrode coupler adapted to electrically couple the collector to the first electrode; and
a terminal opening adapted to electrically couple the collector to the first terminal, wherein the first fuse unit and the second fuse unit are between the electrode coupler and the terminal opening.

3. A battery module comprising the rechargeable battery of claim 2 and at least one other rechargeable battery, wherein the rechargeable batteries are electrically coupled to each other in parallel,
wherein when the first and the second electrodes are electrically coupled by a short circuit, a first portion of a short circuit current flows to the first electrode from the second electrode via the connector and the second fuse unit, and a second portion of the short circuit current flows to the first terminal from the second electrode via the connector and the first fuse unit, and
wherein the second portion of the short circuit current is greater than the first portion of the short circuit current.

4. A battery module comprising the rechargeable battery of claim 1 and at least one other rechargeable battery, wherein the rechargeable batteries are electrically coupled to each other in parallel,
wherein when the first and the second electrodes are electrically coupled by a short circuit, a first portion of a short circuit current flows to the first electrode from the second electrode via the connector and the second fuse unit, and a second portion of the short circuit current flows to the first terminal from the second electrode via the connector and the first fuse unit, and
wherein the second portion of the short circuit current is greater than the first portion of the short circuit current.

5. The rechargeable battery of claim 1, wherein the current collector further comprises:
an upper plate; and
a side plate bent from the upper plate.

6. The rechargeable battery of claim 5, wherein the first and second fuse units are at the upper plate.

7. The rechargeable battery of claim 6, wherein the first and second fuse units have fuse openings at centers of the first and second fuse units, respectively.

8. The rechargeable battery of claim 6, wherein the first and second fuse units have fuse grooves at sides of the first and second fuse units, respectively.

9. The rechargeable battery of claim 8, wherein the connector has ends that are bent.

10. The rechargeable battery of claim 5, wherein the first fuse unit is at the upper plate and the second fuse unit is at the side plate such that the second fuse unit is further from the cap plate than the first fuse unit.

11. The rechargeable battery of claim 10, wherein the first fuse unit has a fuse opening at its center, and
wherein the second fuse unit has fuse grooves at sides of the second fuse unit such that the second fuse unit has a cross-sectional area that is smaller than that of the first fuse unit.

12. The rechargeable battery of claim 1, further comprising a short circuit member adapted to cause short circuit current to flow through the first and second fuse units.

13. The rechargeable battery of claim 12, wherein the first and second fuse units are configured to melt before the short circuit member in response to the short circuit current.

14. The rechargeable battery of claim 1, wherein the connector is smaller than the first terminal.

15. The rechargeable battery of claim 1, wherein the first terminal and the cap plate are insulated from each other by a terminal insulator.

16. A battery module comprising the rechargeable battery of claim 1 and at least one other rechargeable battery, wherein the rechargeable batteries are electrically coupled to each other in series.

* * * * *